United States Patent [19]

Forti et al.

[11] Patent Number: 5,028,776

[45] Date of Patent: Jul. 2, 1991

[54] HIGH HAT ACTUATING SYSTEM WITH PHOTOELECTRIC CONTROL MEANS

[75] Inventors: Steven Forti, P.O. Box 393, 321 Winter, Norwall, Mass. 02061; William B. Lee, Middleborough, Mass.

[73] Assignee: Steven Forti, Norwell, Mass.

[21] Appl. No.: 525,720

[22] Filed: May 21, 1990

[51] Int. Cl.$^5$ ............................ G01D 5/34; H01J 1/56

[52] U.S. Cl. .................................... 250/229; 250/221; 84/422.3; 84/421; 84/746; 84/721

[58] Field of Search .................. 250/229, 221; 84/746, 84/721, 422

[56] References Cited

U.S. PATENT DOCUMENTS

| | | | |
|---|---|---|---|
| 4,526,079 | 7/1985 | Oguri | 84/644 |
| 4,528,888 | 7/1985 | Hoshino | 84/422 |
| 4,667,562 | 5/1987 | Lee | 84/422 |
| 4,730,532 | 3/1988 | Bauerfeind | 84/422 |

FOREIGN PATENT DOCUMENTS 1382432 1/1975 United Kingdom .

*Primary Examiner*—David C. Nelms
*Assistant Examiner*—T. Davenport
*Attorney, Agent, or Firm*—Nixon & Vanderhye

[57] ABSTRACT

A high hat cymbals device is automatically actuated to hold the cymbals locked in place. The presence or absence of the drummer's foot on or above the foot pedal for actuating the high hat is sensed, and the cymbals held together if the drummer's foot is not sensed. Sensing is accomplished utilizing an infrared LED or other source of light, preferably one that is pulsed and frequency modulated, and a photodiode or other light sensing device. The signal from the photodiode is filtered and amplified and ultimately operates a solenoid to either allow normal operation of the high hat, or move the high hat cymbals together. The light source and sensor are mounted on the bottom of the foot pedal and cooperate with an opening in the foot pedal so that the light is reflected to the photodiode if the drummer's foot is present on or above the foot pedal, but passes through the opening if it is not.

20 Claims, 2 Drawing Sheets

HIGH HAT ACTUATING SYSTEM WITH PHOTOELECTRIC CONTROL MEANS

BACKGROUND AND SUMMARY OF THE INVENTION

High hat cymbals are common equipment for bands, particularly for rock bands. The high hat cymbals are one part of a number of different percussion instruments that an accomplished drummer must play during the course of a live performance. The high hat cymbals comprise a stationary upwardly facing cymbal, a movable downwardly facing cymbal, a stand, and a central shaft extending through the stand operable to move the movable cymbal into and out of contact with the stationary cymbal. Typically a spring or like biasing means biases the top cymbal out of contact with the bottom cymbal. The drummer operates the cymbals utilizing a foot pedal.

There are many musical scores for which it is desirable for the drummer to impact the cymbals while they are in a position in which they are held together. This is most typically accomplished by the drummer holding the foot pedal in a depressed condition to continuously hold the cymbals together. However if the drummer must also operate a number of other instruments with his or her foot, it is impractical to dedicate one foot to holding down the foot pedal of the high hat. For that reason, it has been proposed to utilize various mechanical locking components to lock the cymbals together, such as shown in U.S. Pat. Nos. 4,730,532 and 4,667,562.

The proposals for manual locking mechanisms are little more practical than the drummer holding the foot pedal depressed with his/her foot, however, since to move the cymbals into the locked position requires another distinct operation by the drummer —an operation that the drummer may not be able to effectively perform since he/she is playing a musical score at the time. Therefore, there is a need for an automatic high hat cymbal locking mechanism.

According to the present invention, a method and apparatus are provided for effectively automatically locking the cymbals of a high hat together. Despite the fact that the cymbals are automatically locked together, when the drummer wishes to use the cymbals in their normal intended operation, that is moving back and forth toward each other by the operation of the foot pedal, the automatic locking mechanism does not interfere with that operation.

According to the preferred embodiment of the present invention, optical means are utilized to provide the automatic sensing that is necessary to effect locking. One would not expect optical means to be effective for use with a high hat because of the environment in which it must successfully operate. A rock concert or like performance may be in a darkened area, light area, or with all sorts of strobe, spot, incandescent, or other light sources variously operating or not operating during the performance. However according to the present invention it has been found that despite the fact one would not normally expect an optical device to be utilizable for automatically operating the high hat, it is extremely effective in the combination and according to the method of the present invention.

One reason why the optical means can be utilized successfully according to the present invention is that it is preferred that the optical source be a source of infrared light. The infrared light is sensed by a reflective receptor, such as a photodiode. It is also desirable that the source of infrared light be pulsed, and have a modulated frequency output.

According to one aspect of the present invention, there is provided a high hat cymbal locking assembly for selectively locking together first and second cymbals of the high hat by moving a central operating shaft connected to one of the cymbals, comprising: A foot pedal for actuating the central shaft to effect movement thereof. Means defining an opening in the foot pedal. A light source and a light sensing means for sensing light from the light source. Means for mounting the light source and the light sensing means in operative association with the foot pedal so that if a drummer's foot is on or above the foot pedal, covering the opening therein, the sensing means will distinguish between that condition and the situation where the opening is uncovered. Operating means for actuating the operating shaft independently of the foot pedal to move the cymbals together; and, circuitry means operatively connecting the light sensing means to the operating means so that when the light sensing means senses the bottom of a shoe. The cymbals spring apart and are ready for operation by the drummer using the conventional foot pedal; and if the shoe is not sensed, the cymbals are held together.

Typically the light source is an infrared LED while the light sensing means comprises a photodiode, the LED being pulsed and frequency modulated by circuitry means and the photodiode output filtered and amplified. The operating means typically comprises a solenoid.

According to another aspect of the present invention there is provided means for sensing the position of a drummer's foot on or above the foot pedal; and, means for actuating the operating shaft in response to the sensing means, for automatically moving the movable cymbal to the second position thereof when a drummer's foot is not sensed on the foot pedal, and for not interfering with operation of the operating shaft when a drummer's foot is sensed on the pedal. The sensing means preferably comprises a light source and means for sensing light from the light source, such as the infrared LED and photodiode as described above.

According to the present invention there also is provided (a) Sensing the absence or presence of a drummer's foot on or above the foot pedal. (b) If the drummer's foot is sensed on or above the foot pedal, allowing normal operation of the high hat by the drummer. And, (c) if the drummer's foot is not sensed on or above the foot pedal, automatically actuating the high hat so that the movable cymbal is held in contact with the stationary cymbal. Step (a) is preferably practiced using pulsed, modulated frequency, infrared light. The foot pedal operates the high hat by moving a shaft, and step (c) is preferably practiced by moving that same shaft independent from the foot pedal.

It is the primary object of the present invention to provide for the effective automatic operation of a high hat to hold the cymbals together when the drummer is not operating the foot pedal of the high hat, but to allow unencumbered operation of the foot pedal when the drummer desires. This and other objects of the invention will become clear from an inspection of the detailed description of the invention and from the appended claims.

DETAILED DESCRIPTION OF THE DRAWINGS

Figure 1:
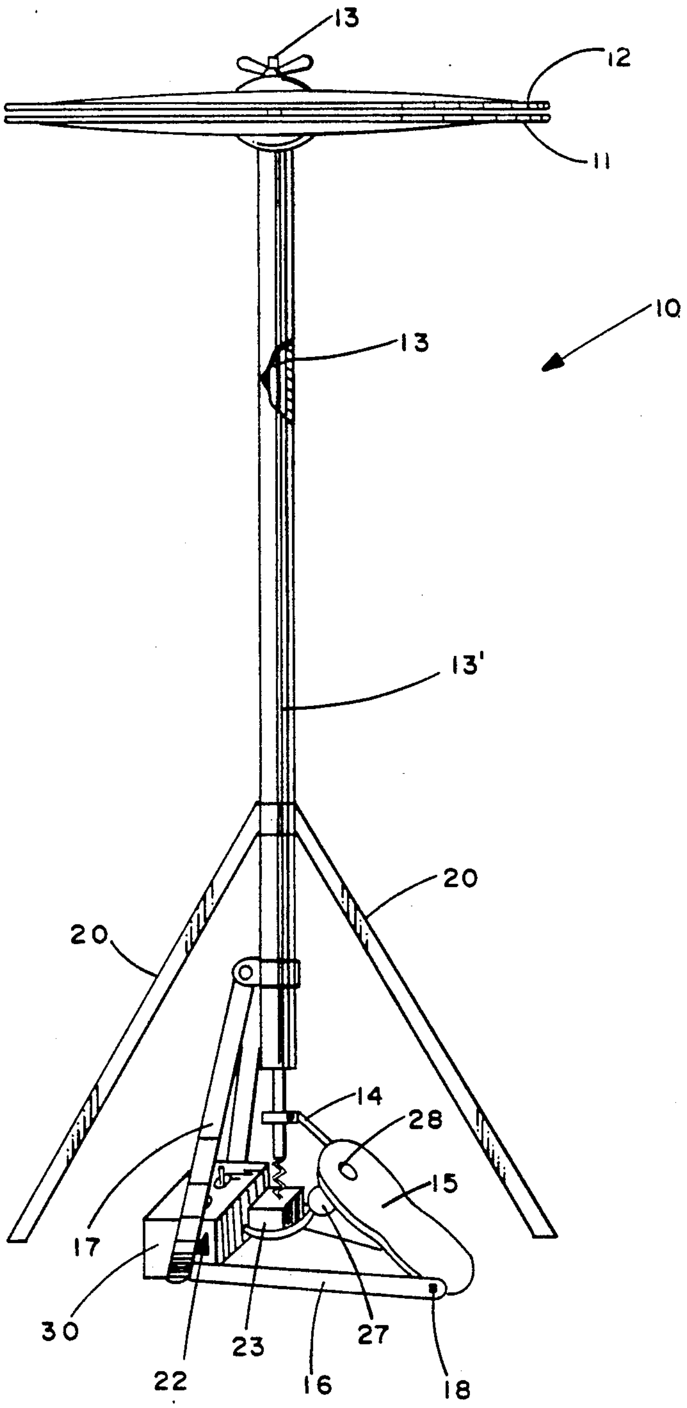
FIG. 1 is a side view, partly in cross-section, partly in elevation, and partly in perspective, of an exemplary high hat according to the present invention, with the cymbals shown in an apart position.
Figure 2:
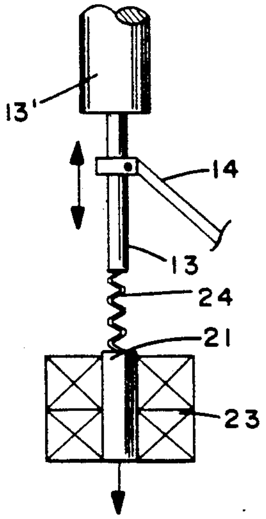
FIG. 2 is a side schematic view of the mechanical structure and solenoid for moving the shaft of the high hat.

A high hat assembly is shown generally by reference numeral 10 in FIG. 1, including a lower cymbal 11 which is stationary and faces upwardly, an upper cymbal 12 which is movable and faces downwardly, and a central shaft 13 that is movable in a tubular portion 13' of a stand for the cymbals. The high hat itself is conventional such as described in said U.S. Pat. No. 4,667,562, and includes a spring or other biasing device (not shown) for normally slightly biasing the cymbals 11, 12 apart. Operation of the high hat to move the cymbals 11, 12 together is provided by the link 14 connected to foot pedal 15, the drummer depressing the foot pedal 15 to effect downward movement of the shaft 13 to move the cymbal 12 into contact with the cymbal 11.

The support mechanism for mounting the foot pedal 15 includes the pedal positioning arms 16, which are connected at one end thereof to the upwardly slanting arms 17 which are connected to the tube 13', and at the other end thereof are connected to pivot pins 18 to the bottom of the pedal 15, to provide for pivoting movement of the foot pedal 15. Outwardly extending legs 20 (preferably at least three) support the tube 13'. Parts 11-18 and 20 are standard high hat parts.

The actuation assembly according to the present invention is shown generally by reference numeral 22 in FIG. 1 and includes a solenoid 23 having an armature 21 and a spring 24 connecting the shaft 13 to the armature 21. Spring 24 is merely a connector between armature 21 and shaft 13 that protects the solenoid 23 from burnout should the shaft be restrained from movement for any reason. The actuation assembly 22 also includes optical elements 27, means defining an opening 28 extending through the foot pedal 15, and a casing 30 for containing the circuitry associated with the actuation assembly 2.

Figure 3:
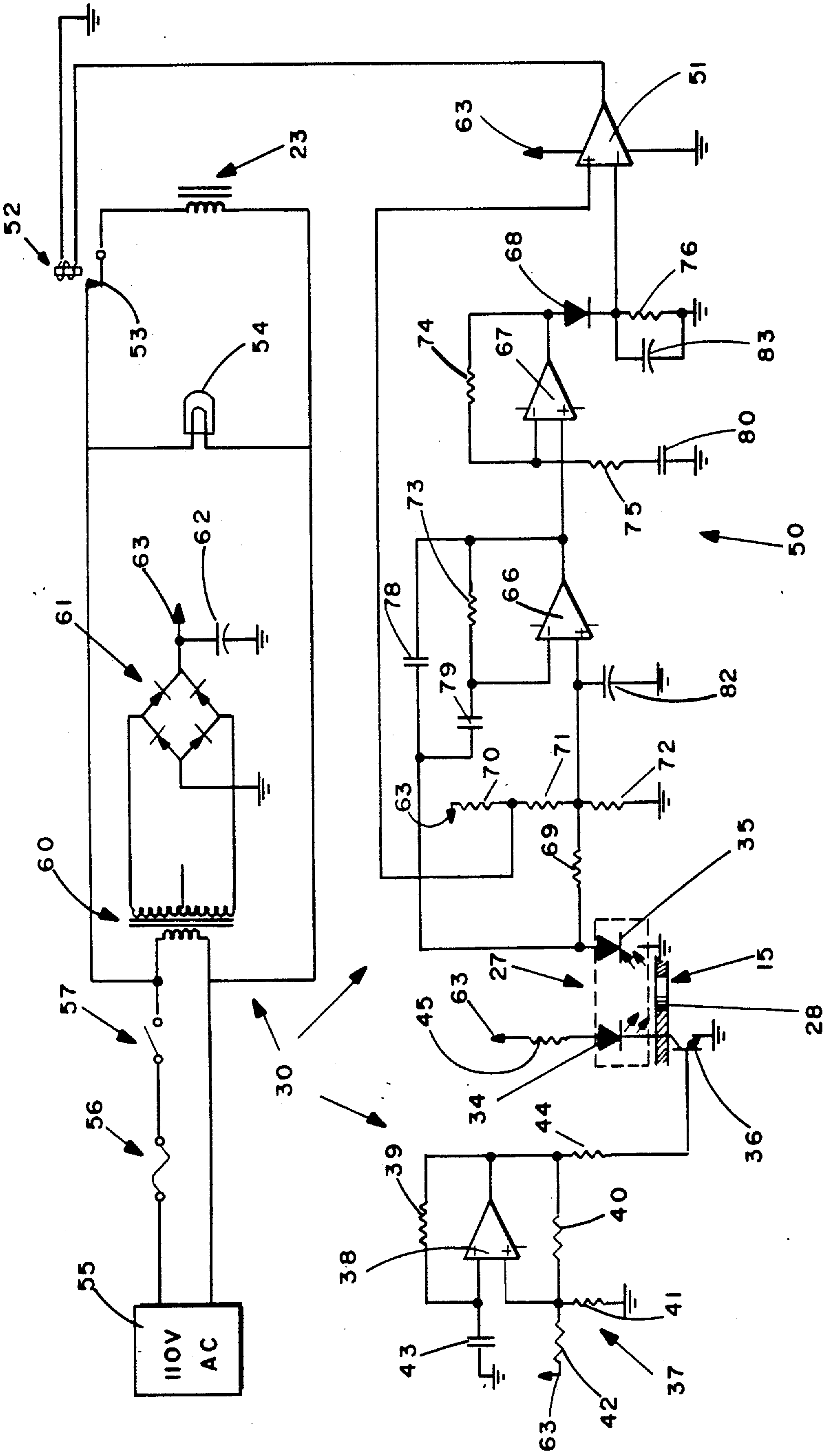
FIG. 3 is an electrical schematic of an exemplary embodiment of the invention.

The optical elements 27 are illustrated in FIG. 3, in association with the foot plate 15 and the through-extending opening 28 therein. The optical elements include a source of light 34, and a light sensing means 35 for sensing light from the light source 34. Preferably the light source 34 is a source of infrared light, ideally an infrared LED, while the light sensing means 35 preferably is a light sensing device, preferably a photodiode, such as a TIL 413 photodiode. The elements 34, 35 are preferably mounted within the structure 27 on the bottom of the foot plate 15 in such a way that normally light emitted from the diode 34 will pass outwardly through the opening 28, and essentially none of it will be reflected to the photodiode 35 (certainly not enough to activate it). However if the drummer has his/her foot on or above the foot pedal 15, over the opening 28, then some of the infrared light will reflect off the bottom of the drummer's foot, and will pass back through the opening 28 to the photodiode 35, energizing it. This is the case even if the drummer has a shoe with a black bottom on it, and regardless of the texture, since there will be enough reflectivity for light to energize the photodiode 35. Note that the infrared LED is connected to ground through the transistor 36, and the photodiode is also connected to ground.

The circuitry 37 illustrated in FIG. 3 is primarily for pulsing and frequency modulating the LED 34. The preferred circuitry includes the differential operational amplifier 38, as well as resistors 39 through 42, and 44, and capacitor 43, all these elements connected up to a 12 volt source of power as indicated. In one operative embodiment, the resistors 39 through 42 would be 100 K, resistor 44 would be 2.2 K, capacitor 43 would 0.001 microfarads, and the amplifier 38 would be an LM 324. While the frequency and pulse duration of the LED 34 are not critical and can be varied widely, a typical frequency would be about 15–20 kilohertz, and a typical pulse duration about 50–75 microseconds.

Connected to the photodiode 35 are means for amplifying and filtering the electrical signal from the photodiode 35, so that only the desired modulated signal is utilized, not background noise. Such means are shown generally by reference numeral 50, and ultimately operate differential operational amplifier 51 which in turn controls a solid state relay 52 which includes a switch 53 to complete a circuit for energizing the solenoid 23. The circuitry completed thereby includes an indicator lamp 54, and the circuitry is connected up to a conventional source of 110 volt AC, indicated by reference numeral 55. Operatively connected to the source of AC current, 55, there preferably is a fuse 56, a single pole single throw switch 57, and a transformer 60, which is connected by a bridge 61 to ground via a capacitor 62 (e.g. a 1,000 microfarad capacitor), and supplies a tap 63 of 12 volt power. The tap 63 is operatively connected to resistors 42 and 45 as illustrated in FIG. 3.

The circuitry 50 includes resistors 69–76, and capacitors 78 through 80, 82 and 83. The capacitors and resistors are operatively connected to the amplifiers 66, 67, and diode 68. All of the amplifiers 51, 66, 67 may be LM 324 units. Typical values for resistors are as follows: 69, 5.26 K; 70, 39 K; 71, 6.8 K; 72, 33 K; 73, 499 K; 74, 20 K; 75, 390 ohms; 76, 100 K. The values of the capacitors which may typically be used are as follows: 78, 0.001 microfarads; 79, 0.001 microfarads; 80, 0.1 microfarad; 82 and 83, 1 microfarad.

Operation

In a typical operation of the apparatus heretofore described, in the practice of the method according to the invention, the absence or presence of the drummer's foot on the foot pedal 15 is sensed. If the drummer's foot is not sensed on the foot pedal, then the solenoid 23 is actuated, moving the armature 21, spring 24, and shaft 13 downwardly. If the drummer's foot is sensed on or above the foot pedal 15, however, then the solenoid 23 is deactivated, so that the cymbals 11, 12 are typically spaced from each other, but are completely free to be operated by the foot pedal 15.

Sensing of the drummer's foot on or above the foot pedal 15 is provided by light—that is infrared light—from pulsed, frequency modulated LED 34 passing to the opening 28. If the drummer's foot is there, the light will be reflected to the photodiode 35, the signal will be amplified and filtered, and then the amplifier 51 will deactivate the relay 52, opening the switch 53, and thereby de-energizing the solenoid 23, lamp 54, etc. If the drummer's foot is not over the opening 28, then the light passes through the opening 28, and will not be received by the photodiode 35, so that the relay 52 will be activated, energizing the solenoid 23 (and lamp 54), and pulling armature 21 and shaft 13 downwardly.

It will thus be seen that according to the present invention a method and apparatus are provided for the effective automatic actuation of high hat cymbals. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and procedures.

What is claimed is:

1. A high hat cymbal locking assembly for selectively locking together first and second cymbals of the high hat by moving a central operating shaft connected to one of the cymbals, comprising:

a foot pedal for actuating said central shaft to effect movement thereof;

means defining an opening in said foot pedal;

a light source and a light sensing means for sensing light from said light source;

means for mounting said light source and said light sensing means in operative association with said foot pedal so that if a drummer's foot is on or above said foot pedal, over said opening therein, said sensing means will distinguish between that condition and the situation where said opening is uncovered;

operating means for actuating said operating shaft independently of said foot pedal to move said cymbals together; and circuitry means operatively connecting said light sensing means to said operating means so that when said light sensing means senses the opening in said foot pedal is uncovered said operating means is actuated to move said operating shaft so that said cymbals are held together.

2. An assembly as recited in claim 1 wherein said light source comprises a source of primarily infrared light.

3. An assembly as recited in claim 2 wherein said light sensing means comprises a photodiode.

4. An assembly as recited in claim 3 wherein said light source comprises an infrared LED.

5. An assembly as recited in claim 1 further comprising pulsing circuitry means for pulsing and frequency modulating said light source.

6. An assembly as recited in claim 5 wherein said circuitry means connecting said light sensing means to said operating means includes filtering means.

7. An assembly as recited in claim 1 wherein said operating means comprises a solenoid having an armature connected by a spring to said central operating shaft.

8. An assembly for automatically actuating a high hat, the high hat including a stationary cymbal, a movable cymbal, an operating shaft for moving said movable cymbal from a first position normally biased out of contact with said stationary cymbal to a second position in contact with said stationary cymbal, and a foot pedal connected to said shaft for moving said shaft from said first position of said movable cymbal to said second position thereof; said assembly comprising:

means for sensing the position of a drummer's foot on or above said foot pedal; and means for actuating said operating shaft in response to said sensing means, for automatically moving said movable cymbal to said second position thereof when a drummer's foot is not sensed on or above said foot pedal, and for not interfering with operation of said operating shaft when a drummer's foot is sensed on or above said pedal.

9. An assembly as recited in claim 8 wherein said sensing means comprises a light source, and means for sensing light from said light source.

10. An assembly as recited in claim 9 wherein said light source comprises a source of primarily infrared light.

11. An assembly as recited in claim 10 wherein said light sensing means comprises a photodiode.

12. An assembly as recited in claim 11 wherein said light source comprises an infrared LED.

13. An assembly as recited in claim 10 further comprising circuitry means for pulsing said light source.

14. An assembly as recited in claim 13 further comprising circuitry means for frequency modulating said light source, and circuitry means for filtering and amplifying the signal from said light sensing means.

15. A method of automatically acting upon the movable cymbal of a high hat having a foot pedal which operates it, to move the movable cymbal into releasable locked contact with the stationary cymbal of the high hat, comprising the steps of:

(a) sensing the absence or presence of a drummer's foot on or above the foot pedal;

(b) if the drummer's foot is sensed on or above the foot pedal, allowing normal operation of the high hat by the drummer; and (c) if the drummer's foot is not sensed on or above the foot pedal, automatically actuating the high hat so that the movable cymbal is held in contact with the stationary cymbal.

16. A method as recited in claim 15 wherein step (a) is practiced using light.

17. A method as recited in claim 15 wherein step (a) is practiced utilizing infrared light.

18. A method as recited in claim 15 wherein step (a) is practiced utilizing pulsed light.

19. A method as recited in claim 15 wherein step (a) is practiced utilizing pulsed, frequency modulated, light.

20. A method as recited in claim 15 wherein the foot pedal operates the high hat by moving a shaft, and wherein step (c) is practiced by moving the same shaft independently of the foot pedal.

* * * * *